United States Patent
Ehegartner et al.

(10) Patent No.: US 11,658,316 B2
(45) Date of Patent: May 23, 2023

(54) FUEL CELL SYSTEM

(71) Applicant: Linde Aktiengesellschaft, Munich (DE)

(72) Inventors: Florian Ehegartner, Neuötting (DE); Martin Knoche, Wetzikon (CH)

(73) Assignee: Linde GmbH, Pullach (DE)

( * ) Notice: Subject to any disclaimer, the term of this patent is extended or adjusted under 35 U.S.C. 154(b) by 555 days.

(21) Appl. No.: 16/652,209

(22) PCT Filed: Oct. 2, 2018

(86) PCT No.: PCT/EP2018/025255
§ 371 (c)(1),
(2) Date: Mar. 30, 2020

(87) PCT Pub. No.: WO2019/068368
PCT Pub. Date: Apr. 11, 2019

(65) Prior Publication Data
US 2020/0251757 A1    Aug. 6, 2020

(30) Foreign Application Priority Data

Oct. 3, 2017 (GB) .................................... 1716144
Oct. 5, 2017 (GB) .................................... 1716316
Dec. 4, 2017 (GB) .................................... 1720183

(51) Int. Cl.
| | | |
|---|---|---|
| *H01M 8/04082* | (2016.01) | |
| *H01M 8/2475* | (2016.01) | |
| *H01M 8/04007* | (2016.01) | |
| *H01M 8/04089* | (2016.01) | |
| *B64D 41/00* | (2006.01) | |

(52) U.S. Cl.
CPC ... *H01M 8/04208* (2013.01); *H01M 8/04007* (2013.01); *H01M 8/04089* (2013.01); *H01M 8/2475* (2013.01); *B64D 2041/005* (2013.01); *H01M 2250/20* (2013.01)

(58) Field of Classification Search
CPC ......... H01M 8/04208; H01M 8/04007; H01M 8/04089; H01M 8/2475; H01M 2250/20; H01M 2250/10; H01M 8/04186; H01M 8/1007; H01M 50/10; B64D 2041/005; Y02B 90/10; Y02E 60/10; Y02E 60/50; Y02T 90/40

See application file for complete search history.

(56) References Cited

U.S. PATENT DOCUMENTS

| | | | |
|---|---|---|---|
| 2002/0177023 A1 | 11/2002 | Fleck et al. | |
| 2007/0119863 A1* | 5/2007 | Hoffjann | H01M 8/04007 429/513 |
| 2010/0225163 A1* | 9/2010 | Knepple | B64D 41/00 307/9.1 |
| 2014/0170513 A1* | 6/2014 | Li | H01M 8/04231 429/429 |
| 2014/0294670 A1* | 10/2014 | Wiget | E04H 1/1277 422/298 |
| 2015/0298811 A1 | 10/2015 | Knepple et al. | |

FOREIGN PATENT DOCUMENTS

JP     2016 082843 A     5/2016

OTHER PUBLICATIONS

International Search Report of the International Searching Authority for PCT/EP2018/025255 dated Jan. 14, 2019.

* cited by examiner

*Primary Examiner* — Muhammad S Siddiquee
(74) *Attorney, Agent, or Firm* — Millen White Zelano & Branigan, PC; Brion P. Heaney

(57) ABSTRACT

The invention relates to a fuel cell system comprising an outer container, defining an enclosed chamber. Inside the enclosed chamber are provided: a storage vessel for storing a cryogenically liquefied working fluid, a gasification device coupled to the storage vessel, a fuel cell arrangement coupled to the gasification device, and a control unit configured to control flow between the components within the enclosed chamber. A power cable is provided which is coupled at one end to the fuel cell arrangement and extending through an exterior wall of the outer chamber such that a second end of the cable extends outside the chamber. The enclosed chamber is substantially sealed such that in use, leaking of the working fluid is substantially prevented.

9 Claims, 3 Drawing Sheets

FUEL CELL SYSTEM

FIELD OF INVENTION

The present invention relates to fuel cell systems using cryogenic working fluids, in particular liquid hydrogen fuel cell systems and more particularly portable or exchangeable liquid hydrogen fuel cell systems.

BACKGROUND OF INVENTION

Cryogenic working fluids, such as liquefied gases (for example hydrogen or helium), must be processed to allow commercially viable transportation. For example, applications with a high consumption of hydrogen, liquid hydrogen is generally used as the preferred storage medium.

To date, tanks used in road vehicles are installed in the vehicle. With the known tanks, either a local energy source must be used to release the liquefied gas from the tanks. The gas must be compressed during the release process and the release process is carried out multiple times. This means that the process uses a large amount of energy.

The following aspects cause the most problems in the known processes:
high energy requirement
release of gasses during the refilling process, which can provide risk at any refilling location, particularly environments which are subject to safety regulations.

Any future solution for providing power must take into account environmental considerations and global targets to reduce greenhouse gas emissions and limit global warming. The use of carbon-based fuels, for example in internal combustion engines, releases dangerous nitrogen oxides into the atmosphere. An alternative is electricity generated from hydrogen fuel cells. However, due to its low density, hydrogen is difficult to store since gas compression requires either high pressures or high volumes.

In large scale applications, such as for example for refuelling of ships or trains with gaseous fuels, it is necessary to take extreme care regarding the safety. In-depth safety studies are carried out taking into account all operational parameters. Such studies have to generally be done for each port or refuelling station. This is very complex because measures have to be taken to prevent the formation of flammable gas mixtures and also to eliminate any possible sources of ignition during refuelling. It is desirable to provide a simple, safe system of providing power supply for the end user.

Embodiments of the invention seek to provide systems which overcome some or all of these disadvantages.

SUMMARY OF INVENTION

In the following description, a gasification device is defined as being a device, such as a vapouriser or gas heater which converts a liquefied gas into at least a flow of vapourised gas.

According to a first aspect of the present invention there is provided a fuel cell system comprising
an outer container, defining an enclosed chamber, wherein inside the enclosed chamber are provided:
a storage vessel for storing a liquefied cryogenic working fluid,
a gasification device coupled to the storage vessel,
a fuel cell arrangement coupled to the vapouriser, and
a control unit configured to control flow between the components within the enclosed chamber;
a power cable coupled at one end to the fuel cell arrangement and extending through an exterior wall of the outer chamber such that a second end of the cable extends outside the chamber;
wherein the enclosed chamber is substantially sealed such that in use, leaking of the working fluid is substantially prevented.

The fuel cell arrangement may comprise at least one fuel cell. The outer container may be gastight, such that the enclosed chamber is essentially sealed from the external environment.

An ambient air inlet may be coupled to the fuel cell arrangement. The air inlet may extend from an outer wall of the outer container to the fuel cell arrangement. A water outlet may be coupled to the fuel cell arrangement. The water outlet may extend from an outer wall of the outer container to the fuel cell arrangement.

The fuel cell system may comprise valves which are provided to control the flow between the components within the chamber The cryogenic working fluid in the storage vessel may be liquid hydrogen.

The fuel cell arrangement may include one or more hydrogen fuel cells. The system may comprise an ambient air inlet coupled to the fuel cell arrangement. The system may comprise a water outlet coupled to the fuel cell arrangement.

The fuel cell system may comprise a battery pack provided in the enclosed chamber. The battery pack may be electrically coupled to the power cable and the fuel cell arrangement (the at least one fuel cell).

The fuel cell system may comprise means to convey heat generated into the fuel cell arrangement to the gasification device.

The gasification device may be a vapouriser, preferably a water bath vapouriser. The gasification device may be a gas heater, preferably an electrical gas heater.

The fuel cell system may further comprise flow meters and/or composition detection sensors in suitable positions within the chamber. The meters and/or sensors configured to monitor operational parameters of at least one of the internal components within the chamber. The outputs from these meters and/or sensors may be fed to the control unit to provide additional data for controlling the internal system components.

According to a further aspect of the invention, there is provided a method for producing electrical energy comprising,
within a substantially enclosed chamber:
providing a stored quantity of a cryogenically liquefied working fluid
gasifying the working fluid
supplying the gasifying working fluid to a fuel cell arrangement,
generating electrical energy in the fuel cell arrangement
wherein in response to an external demand for power, conveying the produced electrical energy from the fuel cell arrangement to outside the enclosed chamber.

The cryogenic working fluid may be liquid hydrogen.
The fuel cell arrangement may comprise at least one fuel cell.

The fuel cell arrangement may comprise at least one hydrogen fuel cell. The method may further comprise providing a supply of ambient air to the at least one hydrogen fuel cell. The method may further comprise extracting a flow of water from the at least one hydrogen fuel cell and conveying outside the chamber.

The method may further comprise controlling the flow of the liquefied working fluid and the flow of the gasified working fluid in order to control the electrical energy output.

The working fluid may be gasified in a gasification device. The method may further comprise conveying a sub-stream of hydrogen from the fuel cell arrangement to provide heat to the gasification device. The method may further comprise conveying a sub-stream of hydrogen from the fuel cell arrangement to provide heat to a vapouriser or a gas heater to provide heat for the step of gasifying.

The method may further comprise conveying heat generated in the fuel cell arrangement to the gasification device. The method may further comprise conveying heat generated in the fuel cell arrangement to the vapouriser/gas heater.

The method may further comprise conveying a sub-stream of hydrogen from the fuel cell arrangement to provide heat to the gasification device.

The method may further comprise charging a battery provided within the enclosed chamber from electrical energy generated by the fuel cell.

The method may further comprise monitoring operational parameters of at least one the internal components within the chamber. The outputs from these meters and/or sensors may be fed to the control unit to provide additional data for controlling the internal system components.

Whilst the invention has been described above, it extends to any inventive combination of features set out above or in the following description or drawings.

BRIEF DESCRIPTION OF THE DRAWINGS

Specific embodiments of the invention will now be described in detail by way of example only and with reference to the accompanying drawings in which.

DETAILED DESCRIPTION

Figure 1:
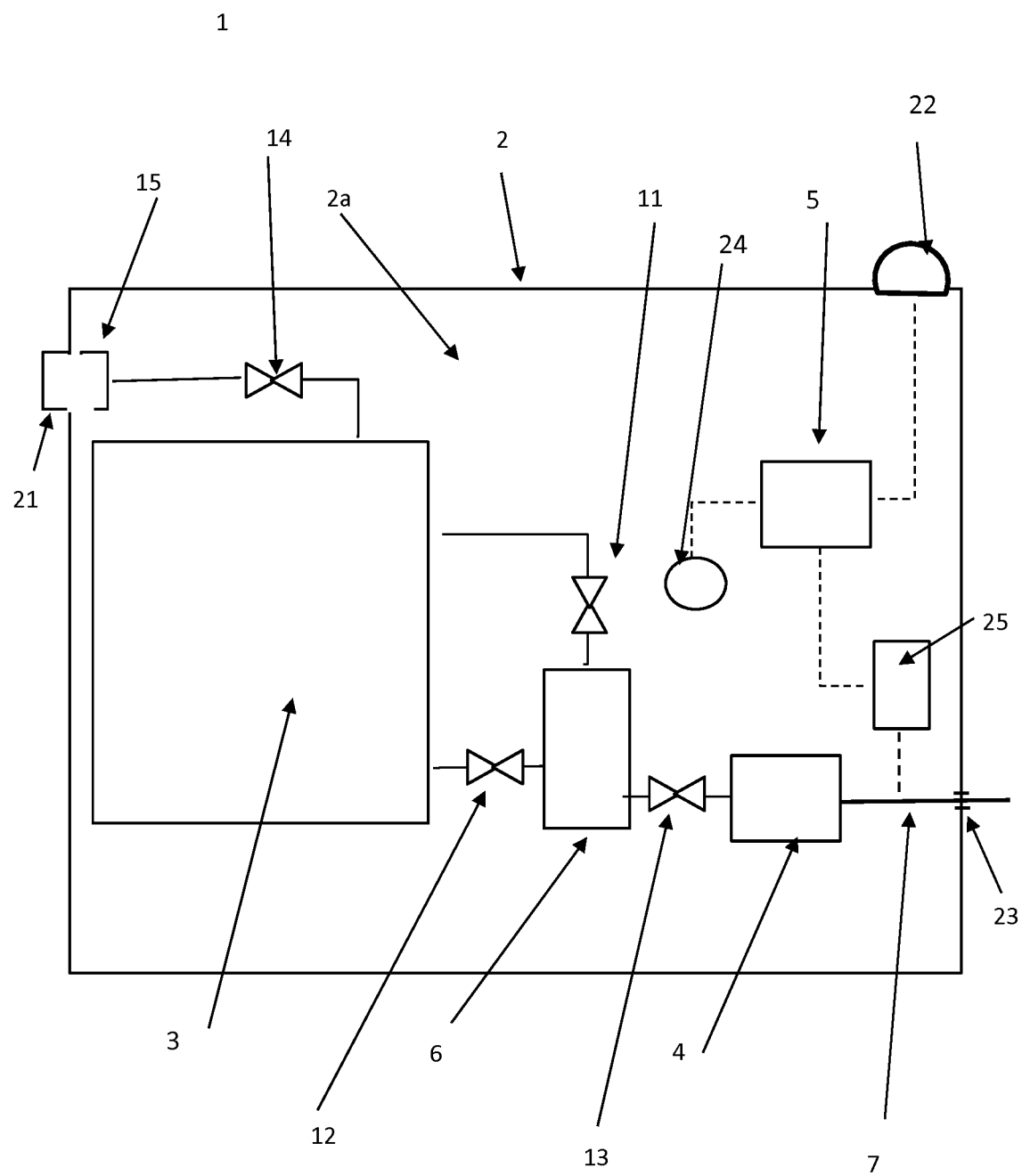
FIG. 1 is a schematic view of a fuel cell system according to an embodiment of the invention.

FIG. 1 shows a cryogenic working fluid fuel cell system 1 according to an embodiment of the invention.

The system 1 comprises a gas tight outer container 2. The container 2 defines an enclosed chamber 2a in which the following internal system components are provided: a storage vessel 3, a fuel cell arrangement 4, a control unit 5 and a gasification device (which may be a vaporizer or a gas heater) 6. The fuel cell arrangement 4 comprises one or more fuel cells. Valves 11, 12, 13 14 are provided in the flow lines between the internal system components in order to control the flow between the components.

The system is provided with a vessel filling connection which is used by an operator to fill/refill the vessel. The vessel filling connection comprises: a filling valve 14, a fill coupling 15, and a gastight outer lock 21. The gastight outer lock 21 is configured such that it can be opened only by operated in a certified EX-Zone safe filling-station.

An electricity meter 25 measures the power consumption. A sensor 24 monitors the environment within the chamber 2a and send signals to the control unit 5. The sensor monitors operating parameters, such but not limited to: gas composition and pressure within the chamber 2a.

The storage vessel 3 is suitable for storing a liquefied cryogenic working fluid. This means that the vessel must be made from a suitable material such as low-temperature steel or cryogenic grade steel, to ensure resilience against the low operating temperatures. The cryogenic working fluid may be any suitable liquefied gas, such as liquid helium, liquid hydrogen, liquid nitrogen, liquefied air or liquefied natural gas (LNG). In a particularly advantageous embodiment, liquefied hydrogen is used. To exist as a liquid, hydrogen must be cooled and then stored below the critical point of hydrogen 33K.

Additionally, flow meters and/or composition detection sensors may be provided in suitable positions within chamber 2a (not show in the figures). The outputs from these meters and/or sensors are fed to the control unit 5 to provide additional data for controlling the internal system components.

The outer container 2 is a rigid-frame container and provides an enclosed chamber 2a in which the other components are housed. The outer container may be, for example, an ISO-container. The enclosed chamber 2 is an essentially sealed chamber, such that any vapour or gas generated inside the chamber 2a does not leak into the external environment.

The gasification device may be vapouriser 6, and a preferred type is a water-bath vapouriser. Alternatively, a gas heater, such as an electrical gas heater may be provided to gasify the working fluid.

The at least one fuel cell 4 is provided appropriate to the cryogenic working fluid. For example, a hydrogen fuel cell is provided when the working fluid is hydrogen. Further, the size and configuration is selected in accordance with the power demand of the intended application.

The fuel cell is connected to a power cable 7, which extends out of the container 2. A gas tight transition 23 is provided at the point where the power cable 7 passes through the wall of the container 2. The electricity can then be conveyed for use or into storage.

The operation of the fuel cell system 1 will now be described.

The liquefied cryogenic working fluid (liquefied gas) is stored in the storage vessel 3. When there is a demand for energy supply, the control unit 5 operates the valves to allow a defined quantity of liquefied gas to be transferred into the gasifying device 6 and then into the fuel cell 4. Electrical power generated by the fuel cell arrangement 4 is supplied through the cable 7 and can be used to provide energy for any desired external use.

Signals are received by the control unit 5 from some or all of the internal system components. This allow the control unit to control operation of each of the valves 11, 12, 13, thereby controlling the flow of fluids through the internal system components.

In an emergency situation, for example if hydrogen leaks into the enclosed chamber or if a pressure increase in the chamber is detected by sensor 24, the control unit 5 sends a signal to an external alarm 22. The alarm 22 may be an audible and/or a visual alarm. In order to gasify the cryogenic liquid (for example the liquefied hydrogen) in the gasification device 6, the gasification device 6 must be supplied with heat. In a preferred embodiment, heat generated in the fuel cell arrangement 4 is supplied back into the gasification device 6. This is not illustrated in the figure.

Alternatively, an external heat source can be used, for example ambient heat from the local atmosphere.

Figure 2:
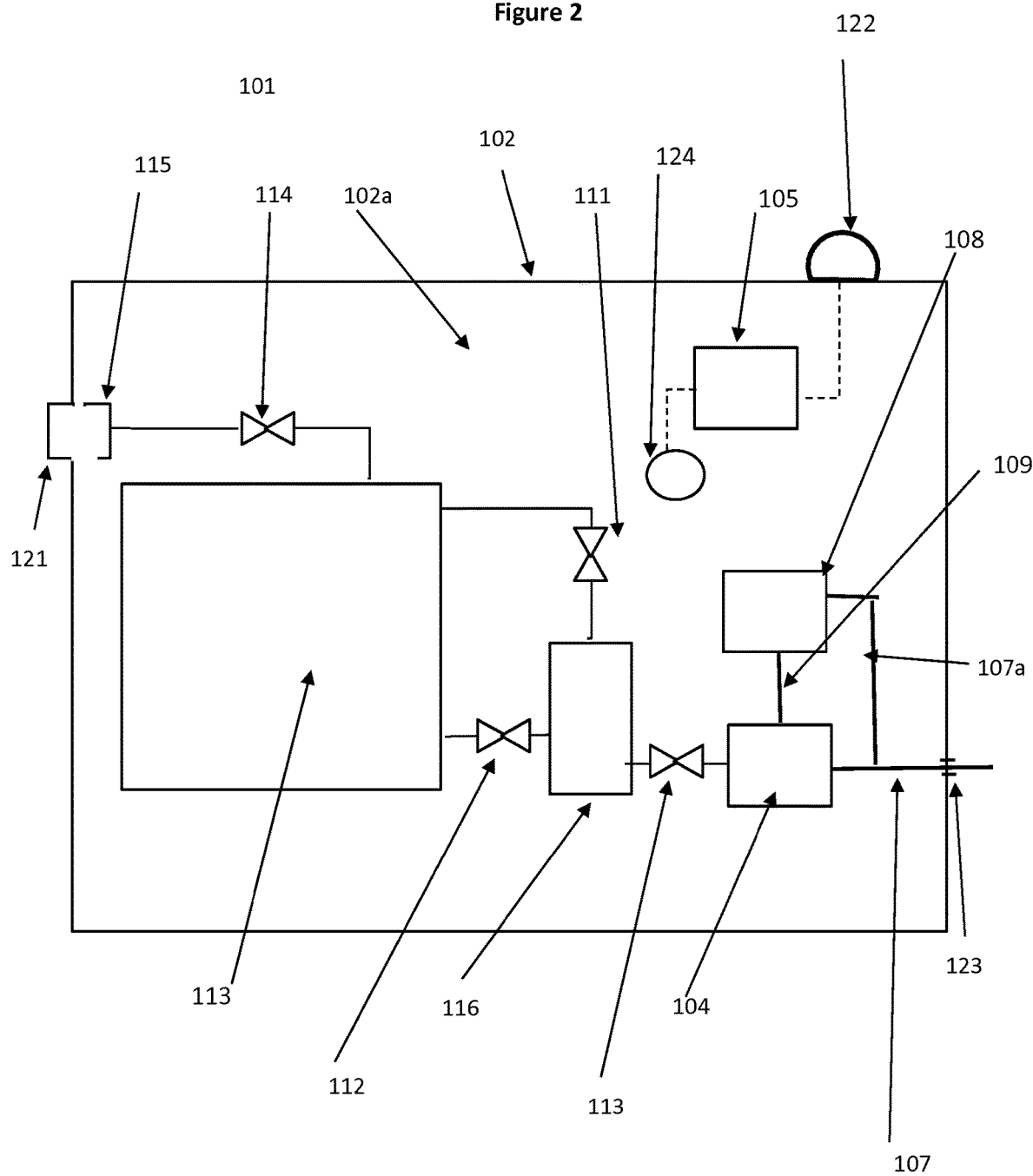
FIG. 2 is a schematic view of a fuel cell system according to a second embodiment of the invention.

FIG. 2 shows a cryogenic working fluid fuel cell system 101 according to another embodiment of the invention. In FIG. 2, features similar to those in the above embodiment are given corresponding reference numerals. For simplicity, some components of FIG. 1 are left out.

The system 101 comprises an outer container 102 defining an enclosed chamber 102a containing: a storage vessel 103, a fuel cell 104, a control unit 105, a vapouriser 106, and valves 111, 112, 113.

The second embodiment is a so-called hybrid design, since it further includes a battery pack 108. The battery pack 108 is electrically coupled to the fuel cell 104 via line 109, and to the power cable 107 via line 107a.

The second embodiment operates in the way described above with reference to the first embodiment. However, in addition, the battery pack 108 can be used to provide additional energy output if there is a spike in demand or at peak loads. When there is no external power load on the fuel cell 104, the fuel cell 104 can charge/recharge the battery via line 109.

As with the above embodiment, heat generated in the fuel cell 104 is supplied back into the gasification device 106 (this flow is not shown in FIG. 2).

Figure 3:
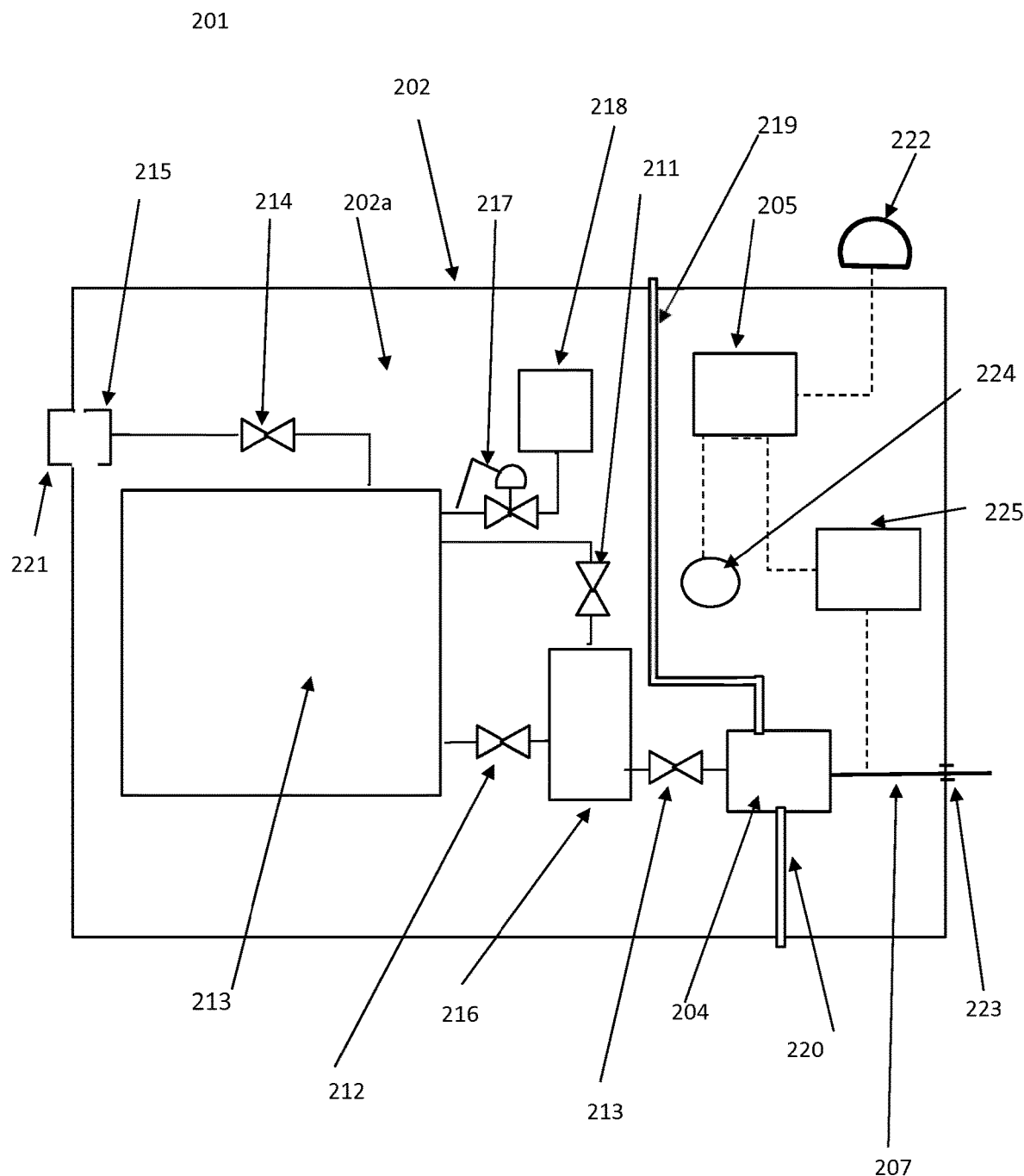
FIG. 3 is a schematic view of a fuel cell system according to a third embodiment of the invention.

FIG. 3 shows a third embodiment of the invention in which hydrogen is used as the working fluid, i.e. a hydrogen fuel cell system 207.

In FIG. 3, features similar to those in the above embodiments are given corresponding reference numerals.

In this embodiment, since the working fluid is hydrogen, the fuel cell arrangement 204 includes one or more hydrogen fuel cells. This requires that air must be inputted to the cell and water must be extracted. To achieve this, an ambient air inlet 219 and a water outlet 220 are coupled between the fuel cell arrangement 204 and the external wall of the gastight container 202. There is connection between ambient air inlet 219 and the water outlet 220 and the enclosed chamber 202a within the container 202.

The system 202 further comprises: a pressure regulator 217, and a gas processing box 218. The gas processing box 218 is configured to convert the H2 into a harmless gas, the gas processing box may be for example a small fuel cell, which creates electricity, which will be destroyed by an electrical heating or lightning element, or by catalytic burning.

The hydrogen fuel cell system 207 operates in a similar way to the operation described above for the earlier embodiments. The liquefied hydrogen is stored in the storage vessel 203. When there is a demand for energy supply, the control unit 205 operates the valves to allow a defined quantity of liquefied gas to be transferred into the gasifying device 206 and then into the hydrogen fuel cell(s) 204. Electrical power generated by the fuel cell(s) 4 is supplied through the cable 207.

During operation of the hydrogen fuel cell(s), air is supplied through the ambient air inlet 219. The air can be supplied from the external environment or any suitable stored source. Waste water is extracted through the water outlet 220 to be disposed of or used as required. The flows through the inlet 219 and outlet 220 are controlled by the control unit 5.

It will be appreciated, that a hybrid version of the hydrogen fuel cell system can also be provided by incorporating a battery in the same way as shown in FIG. 2.

In further embodiments, not shown in the figures, heat generated by the fuel cell(s) is routed back to the gasification device in order to provide the heat necessary to convert the liquefied working liquid into a gas. It will be appreciated that in all of the above described embodiments, heat from the fuel cells can be conveyed to the gasification device.

With a fuel cell system of the invention, the user can use simply attached the power cable 7,107, 207 to any system requiring energy (not shown in the figure). The simple plug-and-play solution of the invention means that the user can easily replace one fuel cell system with another. The result is a quick and easy change over meaning a consistent power supply can be ensured. Depending on the user requirements, specific filling levels can be supplied. Refilling losses can be avoided because the containers can be refilled directly at the working fluid condenser, in particular, for a system incorporating hydrogen as the working fluid, at the hydrogen condenser. Since the user is supplied with a complete unit, they do not have to handle any potentially dangerous gases themselves. Furthermore, the fuel cell maintenance is no longer carried out in the location that the fuel cell is used, for example in a vehicle, since with the removable system of the invention, when necessary the fuel cell can be maintained when the system is removed from the use location.

No additional tank systems are required, because known fuel cell technology can be incorporated into the system of the invention.

The control unit 5, 105, 205 receives inputs from sensors and meters provided within the system components (not shown in the figures) and monitors operational parameters of the fuel system. The control system 5 is provided with communication equipment which is configured to remotely link to a receiver module in a working fluid filling station. The control unit sends operational status data (GPS position, power consumption) to the filling station, which enables the filling station to calculate estimated requirements for exchange of the fuel cell system 1.

The fuel cell system of the invention, in particular hydrogen fuel cell systems according to the invention, can be used in a wide variety of applications, for example, but not limited to, road vehicle such as lorries or cars, trains, ships, construction vehicles. For such applications, hydrogen fuel cell system exchange and refilling stations can be provided at suitable terminals, such as ports, transport hubs and train depots.

The fuel cell system can also be used as a stand-alone, or off-grid, electricity supply, for example in remote locations for festivals, camping, construction sites or sporting events.

It will be appreciated that the dimensions of the system can be varied in accordance with the application. For example, larger systems can be provided for high power demand applications with a long running time between refill opportunities.

All of the invention has been described above with reference to one or more preferred embodiments. It will be appreciated that various changes or modifications may be made without departing from the scope of the invention as defined in the appended claims.

The invention claimed is:

1. A fuel cell system comprising: an outer container, wherein inside the outer container are provided the following components:
   a storage vessel for storing a cryogenically liquefied working fluid, wherein the cryogenically liquefied working fluid in the storage vessel is liquid hydrogen,
   a fuel cell arrangement, wherein the fuel cell arragnement includes one or more hydrogen fuel cells, and
   a power cable coupled at one end to the fuel cell arrangement and extending through an exterior wall of the outer container such that a second end of the cable extends outside the outer container;

wherein the outer container defines an enclosed chamber, the enclosed chamber is substantially sealed such that, in use, leaking of the working fluid is substantially prevented,
a gasification device is provided inside the enclsoed chamber and is coupled to the storage vessel and to the fuel cell arrangement,
an ambient air inlet is coupled to the fuel cell arrangement,
the fuel cell arrangement is a replaceable plug-and-play unit for a road vehicle, a train, a ship, or a construction vehicle, and
a control unit provided inside the enclosed chamber is configured to control flow between components within the enclosed chamber, wherein valves are provided to control the flow between the components within the enclosed chamber.

2. A fuel cell system according to claim 1, wherein the fuel cell arrangement includes a water outlet coupled to the fuel cell arrangement.

3. A fuel cell system according to claim 1, further comprising a battery pack provided in the enclosed chamber, wherein the battery pack is electrically coupled to the power cable and to the fuel cell arrangement.

4. A fuel cell system according to claim 1, further comprising means to convey heat generated in the at least one fuel cell to the gasification device.

5. A method for producing electrical energy comprising, within an outer container,
providing a stored quantity of a cryogenically liquefied working fluid in storage vessel, the cryogenically liquefied working fluid is liquid hydrogen;
gasifying the cryogentically liquified working fluid;
supplying gasified working fluid to a fuel cell arrangement comprising at least one hydrogen fuel cell; and
generating electrical energy in the at least one fuel cell;
wherein
in response to an external demand for power, electrical energy produced from the at least one fuel cell is conveyed to outside the outer container,
the outer container defines a substantially enclosed chamber, the enclosed chamber is substantially sealed such that in use, leaking of the working fluid is substantially prevented,
a supply of ambient air is provided to the at least one hydrogen fuel cell,
gasifying of the working fluid is performed in a gasification device, and said gasification device is provided inside the enclosed chamber and is coupled to the storage vessel and to the fuel cell arrangement,
the substantially enclosed chamber is a replaceable plug-and-play unit for the road vehicle, the train, the ship, or the construction vehicle, and a road vehicle, a train, a ship, or a construction vehicle is attached to the cable,
flow between components within the enclosed chamber is controlled by a controller unit which is provided inside the enclosed chamber and which is configured to control the flow within the enclosed chamber, wherein valves are provided to control the flow between the components within the enclosed chamber.

6. The method according to claim 5, further comprising extracting a flow of water from the at least one hydrogen fuel cell and conveying the flow of water outside the chamber.

7. The method according to claim 5, wherein further comprising conveying heat generated in the fuel cell arrangement to the gasification device.

8. The method according to claim 7, further comprising conveying a sub-stream of hydrogen from the fuel cell arrangement to provide heat to the gasification device.

9. The method according to claim 5, further comprising charging a battery provided within the enclosed chamber using electrical energy generated by the fuel cell arrangement.

* * * * *